Patented Dec. 12, 1933

1,939,625

UNITED STATES PATENT OFFICE 1,939,625

METHOD OF PRODUCING FORMATE OF POTASSIUM FROM POTASSIUM SULPHATE AND CALCIUM FORMATE OR MIXTURES OF CONSTITUENTS ADAPTED TO FORM THE LATTER BY WAY OF REACTION

Emil Hene, Berlin-Grunewald, Germany, assignor to Rudolph Koepp & Co. Chem. Fabrik A. G. Oestrich, Rheingau, Germany, a German Company No Drawing. Application October 20, 1930, Serial No. 490,104, and in Germany November 14, 1929

2 Claims. (Cl. 260—118)

My invention relates to the manufacture of potassium formate.

It is a well known fact that potassium formate can be produced from alkali-earth formates and potassium sulphate. In practice, however, it was impossible up to now to accomplish this conversion quantitatively without the addition of other chemical agents.

According to the known methods the conversion or reaction of calcium formate with sodium sulphate gives yields only a little above 80 per cent; the yield is still less satisfactory if the reaction is carried out with potassium sulphate.

After much study and research I have discovered the cause of the unsatisfactory conversion and yield, and subsequently I have found a way of carrying out the reaction or conversion in a new manner and with the result of a practically quantitative yield and without using any additional agents.

I have found, that in any aqueous solution which contains calcium, potassium, a sulphate residue and a formate residue under certain conditions an equilibrium is formed which does not involve the formation of gypsum as precipitate but leads to the precipitation of syngenite, containing $K_2SO_4 + CaSO_4$.

This equilibrium can be obtained if aqueous solution containing 40 to 70% potassium formate and 60 to 30% of calcium formate respectively react with potassium sulphate, which reaction leads to the formation of syngenite.

The syngenite on the other hand reacts with formate of calcium so as to bring about conversions resulting in the production of a solution of potassium formate and calcium formate while almost pure gypsum will be precipitated.

This new observation may be utilized in all cases in which it is desired to produce in a simple and inexpensive manner practically quantitative conversions and yields of potassium formate, without the application of any auxiliary agents as hitherto employed.

For instance, I start with the preparation of an aqueous solution of potassium formate and calcium formate (1) $5Ca(COOH)_2 + 3K_2SO_4 =$
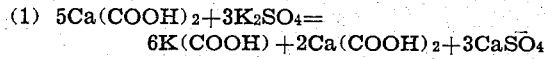

I now add to the thus prepared solution a sufficient quantity of sulphate of potassium to cause practically all calcium to be precipitated, while at the same time forming therein syngenite and to obtain a technically pure solution of formate of potassium, whereupon I separate the clear solution from the insoluble precipitate of syngenite.

(2) $3KCOOH + Ca(COOH)_2 + 2K_2SO_4 =$
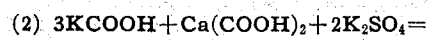
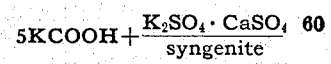

The syngenite is mixed with a pure solution of calcium formate in a vessel provided with a stirrer; the stirrer being put in motion the syngenite is then decomposed and a solution is produced containing potassium formate and calcium formate, the precipitate now consisting substantially of pure gypsum, (3) 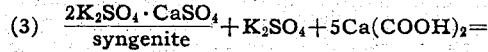
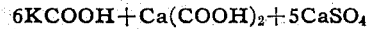

The solution is filtrated and treated with sulphate of potassium for the purpose of converting the calcium formate into potassium formate.

In some cases it may be advisable to inspissate the solution containing potassium formate and calcium formate in order to obtain a practically pure solution of potassium formate while the calcium formate will precipitate and upon filtration may be treated with sulphate of potassium or syngenite for the purpose of obtaining a new solution containing potassium formate and calcium formate.

Example I 500 litres of an aqueous solution containing 130 kg. of formate of calcium are mixed in a suitable vessel provided with a stirrer, with 117 kg. of crude sulphate of potassium containing 90 per cent of pure sulphate of potassium, whereupon the stirrer is put in motion for about one hour. Subsequently the liquor is separated from the precipitate by way of filtration and the latter is subjected to a washing treatment. The recovered liquor or solution amounts to about 500 litres containing about 100 kg. of potassium formate and 52 kg. of calcium formate.

The solution produced in this manner is mixed with 195 kg. of potassium sulphate and stirred for about one hour at a temperature of 30° to 40° C., whereupon the liquor is again separated from the sediment by filtration and the latter is washed free of soluble salts. The recoverable solution amounting to about 500 litres will contain approximately 160 kg. of formate of potassium. The recovered sediment or precipitate consisting of syngenite is mixed with 500 litres of the same solution of calcium formate and stirred as hereinbefore described with the result, that a substance will be separated out by precipitation, which is practically pure gypsum and the solution or liquid to be separated therefrom by filtration, will contain 52 kg. of calcium formate and 100 kg. of potassium formate approximately in 500 litres.

Example II

In a suitable vessel such as an autoclave 1000 litres of milk of lime are mixed with about 56 kg. of caustic lime and 120 kg. of sulphate of potassium and subsequently treated in the usual manner with carbon monoxide at a raised pressure and at an elevated temperature. The treatment of the mixture is continued until practically all free lime is bound or converted. Subsequently the resulting solution containing potassium formate and calcium formate, is separated from the precipitated gypsum by filtration.

The clear solution thus prepared is now mixed in a vessel provided with a stirrer with about 180 kg. of sulphate of potassium and the stirrer is put in motion for a sufficient length of time to ensure complete reaction. The mixture is now subjected to filtration in order to separate the precipitate consisting of syngenite from the clear solution containing pure formate of potassium.

The syngenite thus recovered is now returned into the autoclave charged with 1000 litres of milk of lime and the mixture is treated with carbon monoxide at elevated pressure and temperature, with the result, that gypsum will form and be precipitated, while the solution formed at the same time contains formate of potassium and formate of calcium. This solution is again separated from the solid precipitate by filtration and subsequently treated with potassium sulphate in the manner described hereinbefore and for the same purpose of recovering a pure solution of formate of potassium.

When the precipitates are washed carefully, the yield of formate of potassium will come up to about 95 per cent. The solutions of formate of potassium produced in accordance with the present invention contain only small proportions of calcium compounds which may be removed by evaporation or precipitation and subsequent filtration.

What I claim is:

1. A process for the manufacture of potassium formate consisting in causing an aqueous solution of calcium formate to react with potassium sulphate in such proportions, that the filtered solution contains 40 to 70% potassium formate and respectively 60 to 30% calcium formate, causing this solution to react with sulphate of potassium so as to form syngenite, separating the latter from the solution of potassium formate, treating the same with an aqueous solution of calcium formate and separating the solution from the precipitated gypsum.

2. A process for the manufacture of potassium formate consisting in mixing milk of lime with caustic lime and potassium sulphate in such proportions and treating the same in the usual manner with carbon monoxide that the filtered solution contains 40 to 70% potassium formate and respectively 60 to 30% calcium formate, causing this solution to react with sulphate of potassium so as to form syngenite, separating the latter from the solution of potassium formate, treating the same with an aqueous solution of calcium formate and separating the solution from the precipitated gypsum.

EMIL HENE.